United States Patent Office 3,504,343
Patented Mar. 31, 1970

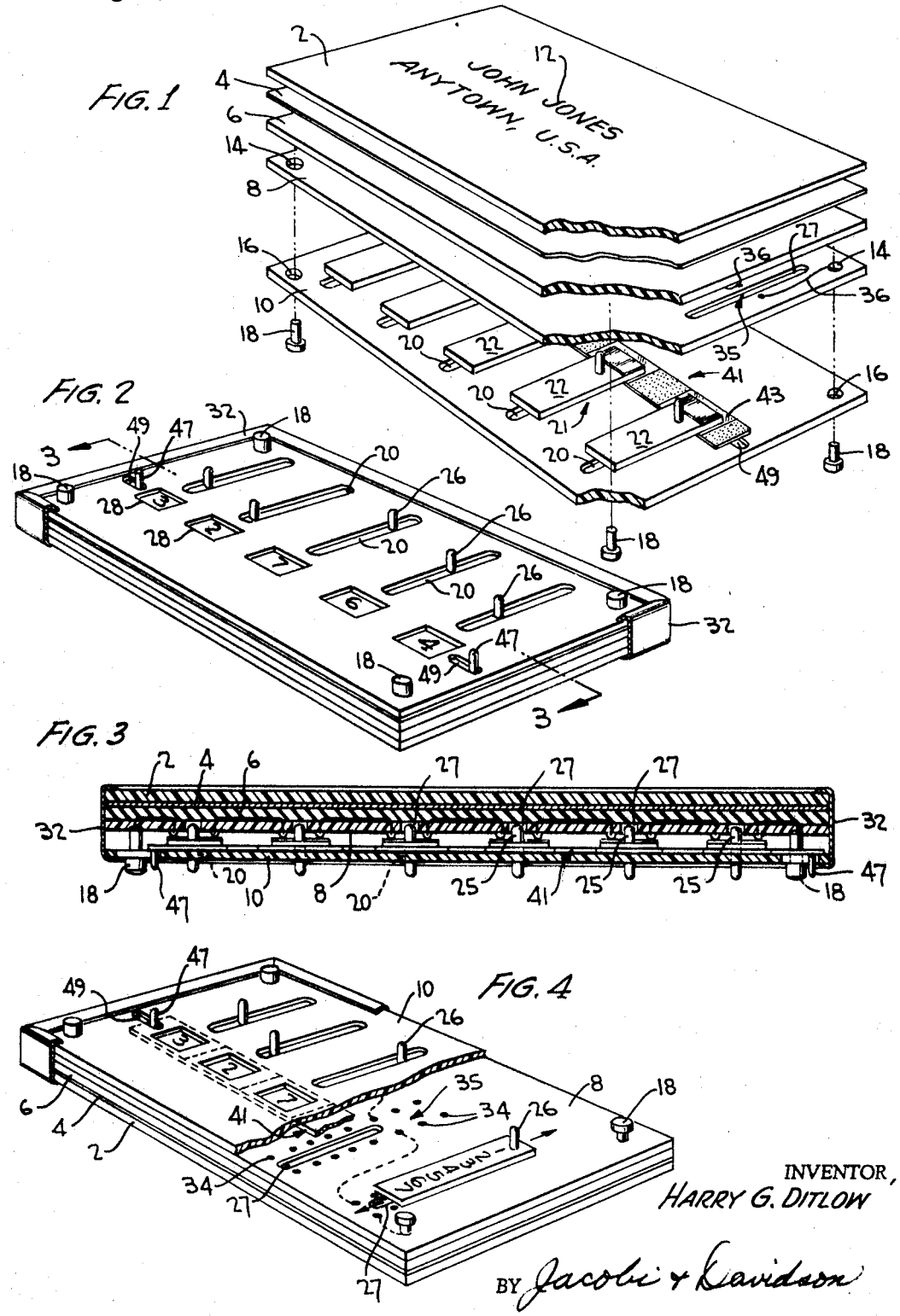
March 31, 1970     H. G. DITLOW     3,504,343
CARD IDENTIFICATION AND VERIFICATION SYSTEM AND DEVICES
Filed Aug. 8, 1967     2 Sheets-Sheet 1
INVENTOR,
HARRY G. DITLOW
BY Jacobi & Davidson
ATTORNEYS March 31, 1970  H. G. DITLOW  3,504,343
CARD IDENTIFICATION AND VERIFICATION SYSTEM AND DEVICES
Filed Aug. 8, 1967  2 Sheets-Sheet 2
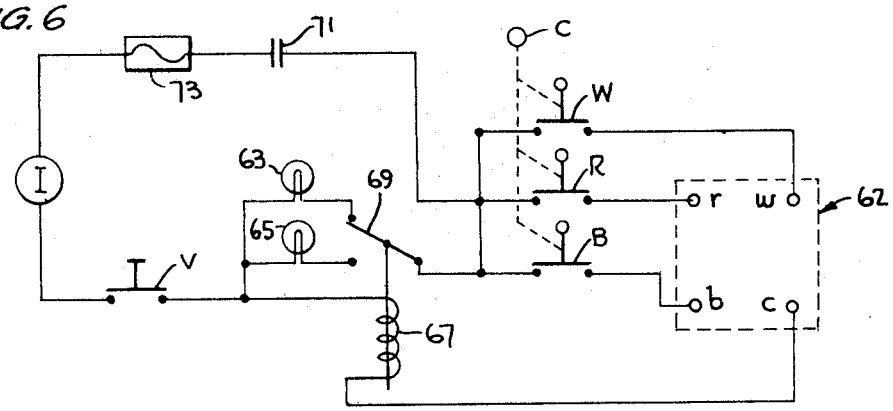
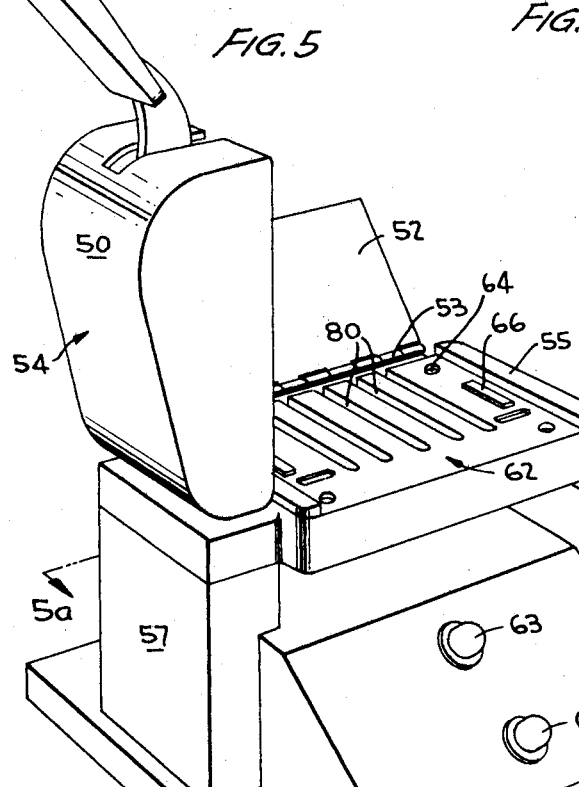
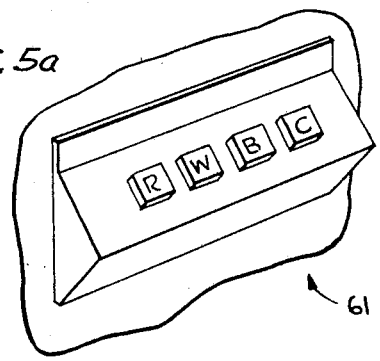
INVENTOR,
HARRY G. DITLOW
BY Jacobi & Davidson
ATTORNEYS

3,504,343
CARD IDENTIFICATION AND VERIFICATION SYSTEM AND DEVICES
Harry G. Ditlow, Camden, N.J., assignor to Ditlow Corporation, Philadelphia, Pa., a corporation of Pennsylvania
Filed Aug. 8, 1967, Ser. No. 659,068
Int. Cl. H04q 1/00
U.S. Cl. 340—149
18 Claims

ABSTRACT OF THE DISCLOSURE

A card idenification and verification system, particularly for credit-card users, wherein the credit-card user is provided with an identification card which contains both a visual indication of his identity as well as an internal personal base code means for providing an incomplete code therein. Selective adjusting means adapted to be operated by the user of the identification card are carried by the identification card and serve to selectively complete the internal base code. A verifying device is provided to validate the internal code of the identification card as completed by the user thereof. The verifying device comprises a modified credit-card imprinting machine containing an identification card holding means and electrical circuitry requiring the holder of the identification card to properly select one of a plurality of code switches before validation of the identification card is initiated.

BACKGROUND OF THE INVENTION

This invention generally relates to identification and verification systems and particularly relates to an identification and verification system for positively identifying the user of a credit-card.

Credit-cards have become more and more in vogue as a substitute for hard currency. A credit-card obviates the need for the user to carry large sums of money during shopping. Additionally, the user of a credit-card is provided with an itemized listing, usually in the form of a single monthly statement, of all purchasing transactions occurring during the month. Unfortunately, the credit-card, by its very nature of providing an immediate and usually unquestioned line of credit, presents distinct and quite obvious disadvantages in case of loss thereof. Loss or theft of a credit-card very often has far-reaching effects extending well beyond the potential harm of a mere loss of a specified sum of currency. This is the case since most credit-card companies hold the credit-card holder responsible for all use made of the credit-card, even unauthorized use, until notification of loss or theft is received, a process which might take several days. Although the liability of a credit-card holder ceases upon notification to the credit-card company, the credit-card company itself may suffier extensive monetary loss until the unauthorized user of the credit-card is apprehended or until actual notification of the theft or loss of the card is distributed to the many retail outlets honoring same.

In an attempt to guard against such monetary loss both to the credit-card holder as well as to the credit-card companies themselves, spaces have been provided on many credit-cards for insertion of an authorized signature. Presumably, retail outlets would not honor a credit-card presented by a person who could not reproduce the authorized signature thereon. Although these authorized signature spaces or blocks are clearly a step in the proper direction, practically speaking, the results have not been very encouraging. An unauthorized user of a credit-card could conceivably reproduce the proper signature with little effort.

Accordingly, many other systems attempting to guard against monetary loss have been devised, at least some of which depend upon the issuance to the credit-card holder of an auxiliary identification card along with the actual credit-card. Such systems usually utilize an identification card which includes a pre-set non-adjustable code thereon personal to the authorized user. Thus, when making a purchase, the user would have to submit the auxiliary identification card as well as the credit-card and the coded auxiliary identification card would then be examined, either visually or electronically, to verify the identity of the user. Such two-card systems have become increasingly popular and the use thereof has extended to many other transactions in addition to credit purchases.

An inherent difficulty, however, is apparent when considering the two-card systems as now utilized. Prior art auxiliary identification cards, as mentioned above, make use of pre-set non-adjustable code personal to the authorized user and then detect or verify the pre-set code during a transaction. Naturally, if only the actual credit-card were lost or stolen, an unauthorized user thereof would not be able to also present the proper coded identification card and thus could not make an unauthorized purchase. However, if a credit-card holder were to lose his entire wallet, including both the actual credit-card and the auxiliary identification card, the situation would be entirely different. This is the case since prior art two-card verification systems merely ascertain whether the auxiliary identification card has the proper pre-set code thereon with respect to the actual credit-card presented. Thus, an unauthorized person who could obtain both the auxiliary identification card as well as the actual credit-card would have no difficulty in completing a credit transaction.

Clearly, there still exits a need for an identification and verification system and devices therefor to identify the user of a credit-card, said system positively identifying only an authorized user thereof, frustrating in a foolproof manner all attempts at unauthorized use. Accordingly, it is the primary object of the instant invention to satisfy this need. Other and more specific objects hereof include:

(a) the provision of an identification card having an incomplete code thereon personal to an authorized user, the identification card including selective adjusting means operated by the user thereof to complete the personal code and thus identify himself;

(b) the provision of an identification card provided with a singular proper internal code which must be selected by the user thereof from a great number of improper codes;

(c) the provision of an identification card including an internal code known only to the authorized user thereof;

(d) the provision of an identification card containing an internal code that cannot readily be detected by unauthorized means;

(e) the provision of an identification system utilizing a card having an internal code to be completed by an authorized user thereof, the validity of the code completion being indicated by a verifying device;

(f) the provision of a verifying device for validating in a fool-proof manner only a correct internal code set within an identification card by the user thereof;

(g) the provision of a verifying device containing circuitry requiring the user of an identification card to properly select one of a plurality of code switches before validation of the identification card is initiated; and (h) the provision of a verifying device that both detects and verifies a code contained within an identification card as well as provides an imprinting action for use with a regular credit-card.

SUMMARY OF THE INVENTION

The present invention, in its broadest form, contemplates the provision of an identification card and a verification device therefor preferably for use with a credit-card. The identification card includes internal base code means for providing an incomplete code arrangement thereon, the code arrangement being personal to an authorized user. Selective adjusting means are carried by the identification card, the selective adjusting means cooperating with the base code means to selectively complete the personal code to indicate an authorized use if the user of the identification card has properly adjusted same. An improper adjustment of the selective adjusting means would not serve to complete the personal code and would indicate unauthorized use. The verification device for validating the internal code of the identification card preferably comprises a credit-card imprinter modified so as to detect and verify the code within the identification card as set by the user thereof. The verifying device is contemplated to produce a validating signal when the personal code within the identification card has been properly set up and is provided with circuitry requiring the holder of the identification card to properly select one of a plurality of code switches included therein before validation is initiated.

More specifically, an identification card is provided which contains a coded, incomplete internal electrical circuit comprising, in its simplest form, an electrical conductor open-circuited at a plurality of predetermined locations within the card itself. The selective adjusting means carried by the identification card and operated by the user thereof preferably comprises movable electrical contact elements adapted to selectively bridge the open-circuited conductor at the predetermined locations within the identification card. Thus, if the selective adjusting means are properly set by the user of the identification card, a complete electrical circuit will be made internally of the card, the condition of the internal electrical circuit being detected and verified by a verifying device.

The verifying device itself includes a credit-card imprinting machine with a credit-card imprinting section modified to contain an identification card holder means adapted to receive the coded identification card and provide electrical connections thereto. A novel electrical verifying circuit including a plurality of code selection switches and colored "go" and "no-go" lights is contained within a housing beneath the credit-card imprinting section, the verifying circuit determining whether the internal identification card circuit is complete.

The actual operation of the above system is contemplated to be such that a credit-card holder wishing to complete a credit transaction would first present the identification card to a clerk after properly adjusting the selective adjusting means carried thereon to complete the internal, coded circuit. The identification card would then be placed in the identification card holder means of the verifying device and a proper code selection switch thereon depressed by the credit-card holder to initiate the verifying operation. The clerk would complete the verifying operation and if the card code is validated, an actual credit-card would be placed on the credit-card imprinting section to terminate the credit transaction. Thus, a system is provided which clearly operates to positively identify only an authorized person, rejecting all others to thus safe-guard the credit-card system.

BRIEF DESCRIPTION OF THE DRAWINGS

The above and other objects and advantages of the instant invention will become more readily apparent when reference is given to the following description of the preferred embodiments thereof along with the annexed sheets of drawings wherein:

FIGURE 1 is an exploded perspective view of an identification card construction in accordance with the present invention;

FIGURE 2 is a perspective view of one side of the identification card constructed in accordance with the present invention;

FIGURE 3 is a cross-sectional view of the identification card of the present invention taken along the line 3—3 of FIGURE 2;

FIGURE 4 is a perspective view of one side of an identification card constructed in accordance with the present invention with parts being broken away for illustrative clarity;

FIGURE 5 is a perspective view of one embodiment of a verifying device constructed in accordance with the present invention;

FIGURE 5A is a perspective view of a portion of a verifying device viewed from the direction of line 5A—5A of FIGURE 5; and FIGURE 6 is an electrical schematic of a verifying circuit utilized in the verifying device of FIGURE 5.

Like reference numerals refer to like parts throughout the several views of the instant drawings.

DESCRIPTION OF THE PREFERRED EMBODIMENTS

Referring now to the drawings and particularly to FIGURES 1 through 4 thereof, a preferred and exemplary embodiment of an identification card constructed in accordance with the present invention is disclosed. The identification card is preferably constructed of five stacked layers to form a "sandwich" arrangement, an exploded view of which is shown in FIGURE 1. Top external layer 2 is fabricated of a plastic material with provisions being made for the name and address 12 or the like of an authorized user to be embossed thereon. Next adjacent layer 4 preferably comprises a metallic foil material which prevents X-ray determination of the configuration of an internal coded electrical circuit carried on the upper surface of plastic layer 8. Layer 6, immediately above and adjacent to layer 8, preferably comprises rubber, tape or other non-conductive material having adhesive on both sides thereof to provide both insulation for the coded electrical circuit on layer 8 as well as bonding of layers 4 and 8.

An incomplete internal code is provided by base code means contained on layer 8 which carries on one surface thereof a coded electrical circuit preferably comprising an electrical conductor 36 broken or open-circuited at a plurality of predetermined locations 35 within the card. Locations 35 are in alignment with selective adjusting means 21 held in place between layers 8 and 10 by protrusions 26 carried within slots 20 on the bottom external layer 10 of the identification card and by protrusions 25 riding in slots or grooves 27 within layer 8. The selective adjusting means 21 serves to selectively complete the incomplete internal code and preferably comprises a plurality of electrical contact carrying members 22 provided at one end thereof with an electrical contact element 24, such as shown. Alternatively, "clock-like" rotary contact carrying members could be utilized if desired with obvious changes in the placement of open-circuit locations 35 being made. The electrical contact carrying members 22 are movable within the slots 20 of layer 10 by protrusions 26 extending to the outside of the identification card so as to be digitally manipulated to effectively bridge the open-circuited conductor means 36 at said plurality of predetermined locations 35 within the identification card. External electrical terminals 18 are adapted to fit within holes 16 and 14 in layers 10 and 8, respectively, and serve to make electrical contact with the internal coded circuit. The entire card sandwich is preferably held together by means of metal crimping 32 or the like.

Referring specifically now to FIGURES 2 and 4, the details of the base code means formed by the internal electrical circuit as well as the details of the selective adjusting means can be clearly ascertained. The base code means for providing an incomplete internal code preferably comprises an electrical conductor 36 carried on one surface of layer 8 and connected between various ones of the external electrical terminals 18 through open-circuit locations 35. Internal terminals 34 are provided on the other surface of layer 8 in numerous pairs of spaced rows aligned with the selective adjusting means 21 mounted between layers 8 and 10. The electrical conductor 36, which could be constructed in accordance with printed circuit techniques, weaves a "snake-like" path on said one surface of layer 8, periodically being taken through layer 8 to the other surface thereof to be connected between one terminal pair of each row of internal terminals 34. Accordingly, electrical conductor 36 is open-circuited at predetermined locations between given pairs of internal terminals 34 within the card. As is apparent, an incomplete electrical "code" is thus provided within the identification card, the electrical "code" being completed only when the open-circuit locations 35 of the electrical conductor 36 are effectively bridged.

The selective adjusting means 21 for bridging the open-circuit locations preferably comprise a plurality of electrical contact carrying members 22 carried between layers 8 and 10 in slots or grooves 27 and 20, respectively. The electrical contact carrying members 22 are each slidably movable into a plurality of possible positions, only one of the possible positions of each of the electrical contact carrying members 22 bringing an associated electrical contact element 24 into alignment with and in bridging relationship to an open-circulated conductor location 35. Indicia 30, such as printed numerals, are provided on one surface of each of the electrical contact carrying members 22 and are externally visible through windows 28 constructed through the surface of external layer 10 near the center thereof.

A sliding strip arrangement generally designated 41 is provided immediately adjacent the inside surface of layer 10 and in alignment with windows 28 therein. The sliding strip arrangement 41 is constructed of plastic having alternating openings 43 therein and serves to selectively cover indicia 30 on contact carrying members 22 when moved sideways. The sliding strip 41 is provided with protruding dowels 47 adapted to fit through slots 49 in layer 10 so as to be digitally manipulated.

As is apparent, a multitude of internal, incomplete electrical codes could be pre-set within each identification card by merely connecting electrical conductor 36 to different terminal pairs of each row of the spaced internal terminals 34. For example, if ten electrical contact carrying members 22 are provided instead of five as illustrated, and each electrical contact carrying member is slidably mounted in operative relationship to a row containing 10 terminal pairs of the spaced internal terminals 34, it would be theoretically possible to provide a number of different personal codes equal to $10^{10}$. An authorized user of the identification card would have to select his given personal code by properly adjusting each one of the ten slidably mounted electrical contact carrying members 22 such that a particular given numeral is visible in each window 30. If the numeral selected in one window is correct, then the electrical contact element 24 carried on the electrical contact carrying member 22 would be in a position such that it bridged one connected terminal pair 34, that is, one of the open-circuit locations in the path of electrical conductor 36. Naturally, if all ten of the electrical contact carrying members are moved into a proper position, a complete internal circuit path would exist between selected ones of the external electrical terminals 18, the completion of this circuit path being monitored to verify the identity of the identification card holder. Considering the great number of positions and combinations that could be set by the electrical contact carrying members 22, and further considering that only one of the many combinations is proper, an unauthorized user of the identification card would have virtually no chance at all of correctly setting a proper code at random.

As an alternative to providing such a great number of electrical contact carrying members 22 which then would require a user of the identification card to memorize a large series of digits, the invention contemplates the provision of an identification card having a reduced number of electrical contact carrying members 22 and containing various internal code "colors" such as red, white and blue. The "color" coded identification card includes the internal electrical conductor 36 connected through the plurality of open-circuit locations 35 adapted to be bridged by the movable electrical contact elements 24. The ends of the electrical conductor 36 are connected between two of the four external card terminals 18 that are preferably provided, one external electrical terminal 18 being designated a "common" terminal, the three remaining external terminals being designated respectively a "red," "white," and "blue" terminal. Thus, if the identification card had an internal "color" code of blue, for example, the internal electrical conductor 36 would make its way between the "common" and "blue" external terminals 18. Likewise, if the identification card had an internal "color" code of red, the "common" and "red" external terminals 18 would be utilized. Thus, a great number of possible personal codes could still be realized even with a reduced number of electrical contact carrying members 22 by utilizing various ones of the external terminals 18 corresponding to different internal code "colors."

An electrical schematic of a verifying circuit that monitors the condition of the internal electrical conductor 36 within an identification card constructed in accordance with the present invention is depicted in FIGURE 6. Dotted lines 62 represent an auxiliary identification card holding means provided with a plurality of contacts 64 designated c, b, r, and w. These electrical terminals 64 correspond to the "common," "red," "white," and "blue" designations provided by the various external electrical terminals 18 of the identification card as discussed above. Assuming that the identification card has a "white" internal code, the internal electrical conductor 36 thereof would be connected through a plurality of open-circuit locations 35 between the "common" and "white" external terminals 18 of the identification card are placed in contact with the terminals 64 of the identification card holding means 62 and the selective adjusting means 21 carried on the identification card are all assumed to be properly selected into a position where each of the open-circuit locations are effectively bridged by an electrical contact element 24. A complete circuit path would then exist between terminals c and w of the holding means 62 through the identification card.

This condition is monitored and verified after a user of the identification card first closes code selector switch W corresponding to the "white" internal code of the identification card. Switch W is of the type wherein it will remain in a closed position until released through a mechanical action of clearing switch C. A verifying push button switch V is then momentarily depressed by a clerk so as to provide a closed circuit path from a current source through a fuse 73, a voltage dropping capacitor 71, switch W, through the internal electrical conductor 36 of the identification card which bridges terminal $w$ and $c$ of the auxiliary card holder 62, through relay coil 67 and back to the current source through verifying switch V. As soon as current flows through the relay coil 67, the relay contact 69 associated therewith will be drawn in a downward direction into operative relationship with an indicating means such as light bulb 65. Light bulb 65 is preferably green in color and serves to indicate to the clerk that the internal coded circuit contained within the identification card is complete. If the selective adjusting means 21 carried on the identification card to be monitored were not placed in a proper position thus not defining a proper personal code or if an improper code selector switch were closed, then no current would flow through relay coil 67. In this situation, the relay contact 69 would remain in the position as shown thus energizing light bulb 63 rather than 65. Light bulb 63 preferably is red in color and, when lit, indicates a "no-go" condition representative of the improper code set within the identification card or of the improper code switch selected, a "no-go" condition being an unauthorized use.

As is apparent, the same verification procedure as discussed above with respect to a "white" identification card could be utilized with identification cards having either a "red" or a "blue" internal "color" code, the only difference in procedure being that switch R or switch B respectively would be initially depressed by the user rather than switch W.

The mechanical details of a verification device containing the verification circuit of FIGURE 6 is depicted in FIGURE 5. The verification device preferably comprises a modified credit-card imprinting 55 and a pressure applying means 50 with operating handle 60 therefor. A credit-card imprinting platform 52 is hingedly connected to section 55 by hinges 53 as shown. The credit-card imprinting platform 52 is adapted to swing either into a closed position over section 55 or into an opened position as illustrated.

An identification card holder or securing means, generally designated 62, preferably comprises a depressed well in the upper surface of credit-card imprinting section 55 and extends to a depth approximately equal to that of the identification card itself. Each of the four corners of the identification card holder means 62 is provided with electrical contact member 64 corresponding to the "common," "red," "white," and "blue," terminals discussed with respect to the circuit of FIGURE 6. Magnets 66 are provided on the floor of the identification card holder means 62 and are adapted to magnetically attract the metal frame 32 of an identification card placed therein. Grooves 80 are provided on the floor of the identification card holder means to receive protrusions 26 of the identification card selective adjusting means 21. Electrical connections are made to each of the electrical contact members 64 through wires running from the credit-card imprinting section 55 down through a supporting column 57 to a housing generally designated 61 containing the verification circuit of FIGURE 6. Housing 61 is adapted to rest upon platform 59 of the credit-card imprinting machine 54. Light bulbs 63 and 65 and the verifying switch V are brought out to one side of the housing 61. Smitches R, W, B, and C are brought out to the opposite side of the housing 61 such as is depicted in FIGURE 5A. It is to be understood, however, that housing 61 with the verification circuit of FIGURE 6 contained therein can be successfully utilized with an identification card holder means as discussed above with virtually any variety of credit-card imprinting machines as well as the variety illustrated.

The operation of the verification device generally discussed above as well as the operation of the entire verification system itself is as follows. A person wishing to make a credit purchase would present his personal identification card constructed in accordance with the instant invention to a clerk, for example. Initially, however, the holder of the identification card would first adjust the selective adjusting means 21 thereon such that each open-circuit location 35 of the internal electrical conductor 36 is bridged by an electrical contact element 24 carried on an electrical contact carrying member 22. In this manner, the code personal to the user would be set up. After setting up his personal code, the holder of the identification card would then block out the windows 28 such that the indicia 30 would not show by means of sliding element 41 discussed above.

The credit-card imprinting platform 52 would then be swung up on its hinges 53 to thus expose the identification card holder means 62 disposed immediately below. The clerk would then place the identification card into the identification card holder 62 such that the four external terminals 18 of the identification card are in alignment with the terminal 64 of the identification card holder means 62. Magnets 66 would attract the metal frame 32 of the identification card and hold same in place during the identification operation. The holder of the identification card would then depress either the switch designated W, R, or B found on housing 61 depending upon the particular internal "color" code of his identification card. The clerk would then momentarily depress the verifying button V on housing 61 and, if the personal code set within the identification card itself had been properly selected and the proper color switch on the verifying device had been correctly selected, the green colored light 65 would be energized. This, of course, would indicate that the person presenting the identification card was authorized. If the personal code set within the identification card had not been properly selected and/or if an improper color code selection switch was closed, the red colored light blub 63 would have become energized thus indicating an unauthorized use.

The identification card would then be removed from the identification card holder 62, the clear switch C depressed by the user of the card, the credit-card imprinting platform 52 swung back into its normal position, and an actual credit-card placed thereon. Now, in a normal fashion, a credit transaction protected from possible fraud would ensue by moving the pressure applying means 50 over the credit card retained upon the imprinting platform 52 to thus imprint the data contained on the actual credit card onto a sales slip or the like.

Although the identification and verification system of the instant invention has been described as being preferably utilized in combination with a credit-card in credit transactions, it is expressly understood that the instant invention is applicable in any situation where positive identification is necessary or desirable. Such situations may be those presented by check cashing, prescription filling and the like.

From the foregoing, it should be readily apparent that the objects initially set forth at the outset of this specification have been successfully achieved. Accordingly, what is claimed is:

1. An identification device comprising:
    card means including base code means for providing an incomplete code thereon; and
    selective adjusting means carried by said card means and cooperating with said base code means for selectively completing said code.

2. An indentification device according to claim 1, wherein said base code means comprises an incomplete electrical circuit, said selective adjusting means carried by said card means selectively completing said incomplete electrical circuit.

3. An indentification device according to claim 2, wherein said incomplete electrical circuit comprises conductor means open-circuited at a plurality of locations within said card means, said selective adjusting means carried by said card means comprising a plurality of electrical contact elements adapted to selectively bridge said open-circuited conductor means at said plurality of locations within said card means.

4. An identification device according to claim 1 further including:
   detector means adapted to receive said card means for detecting and indicating a completed code thereon.

5. An identification device comprising:
   card means including first and second stacked layers;
   electrical circuit means carried on said second stacked layer, said electrical circuit means comprising conductor means open-circuited at predetermined locations on said second stacked layer; and
   selective adjusting means disposed between said first and second stacked layers, said selective adjusting means providing electrical contact elements adapted to selectively bridge said open-circuited conductor means at said predetermined locations on said second stacked layer.

6. An identification device according to claim 5, wherein said selective adjusting means includes a plurality of electrical contact carrying members each movable into a plurality of positions, only one of said plurality of positions of each electrical contact carrying member bringing an associated electrical contact element into alignment with and in bridging relationship to said open-circuited conductor means at said predetermined locations on said second stacked layer.

7. An identification device according to claim 6, further including indicating means for indicating the position of each electrical contact carrying member.

8. An identification device according to claim 7, further comprising external electrical terminal means disposed on said card means connected to said conductor means.

9. An identification device according to claim 8, further including third, fourth and fifth stacked layers, said third stacked layer comprising rubber material, said fourth stacked layer comprising a metallic foil, said fifth stacked layer comprising a plastic name-plate, and wherein said first and fifth stacked layers comprise external end layers of said card means.

10. An identification device according to claim 8, wherein said conductor means is connected to preselected ones of said external electrical terminal means.

11. An identification device according to claim 8, further including third and fourth stacked layers, said third stacked layer comprising an electrically non-conductive bonding material, said fourth stacked layer comprising a material substantially impervious to radiation.

12. A verifying device for a coded identification card of the type having an internal electrical circuit and external terminals connected thereto, said verifying device comprising:
   credit-card imprinting means comprising an imprinting platform and a pressure applying means therefor;
   identification card holder means for receiving said coded identification card, said identification card holder means being disposed on said credit-card imprinting means and including a plurality of electrical contact members for providing electrical connections to said external terminals of said coded identification card; and
   electrical circuit means operatively connected to said electrical contact members of said identification card holder means and adapted to provide a verifying signal indicative of the condition of said internal electrical circuit of said coded identification card.

13. A verifying device according to claim 12, further including a plurality of selection switch means for operatively connecting selected ones of said electrical contact members of said identification card holder means to said electrical circuit means.

14. A verifying device according to claim 13, wherein said electrical circuit means is responsive to open and closed circuit conditions between said selected ones of said electrical contact members of said identification card holder means.

15. A verifying device according to claim 12, further including means for displaceably securing said imprinting platform to said credit-card imprinting means, said imprinting platform normally being secured in operative position with said pressure applying means and being displaceably from said operative position.

16. A verifying device according to claim 15, wherein said identification card holder means is disposed beneath said displaceable imprinting platform in general alignment with said operative position thereof.

17. A verifying device according to claim 16, wherein said identification card holder means is provided with retaining means for retaining an indentification card placed therein.

18. A verifying device according to claim 17, wherein said retaining means comprises magnets.

References Cited
UNITED STATES PATENTS

| | | | |
|---|---|---|---|
| 2,921,997 | 1/1960 | Greveling | 200—43 |
| 3,352,981 | 11/1967 | Ekers | 200—46 |
| 3,430,200 | 2/1969 | Barney | 200—46 XR |

DONALD J. YUSKO, Primary Examiner

U.S. Cl. X.R.
200—43, 46